(12) United States Patent
Iijima et al.

(10) Patent No.: US 7,803,346 B2
(45) Date of Patent: Sep. 28, 2010

(54) METHOD OF SELECTING STRUCTURE OF CARBON NANOTUBE THROUGH PHOTOIRRADIATION

(75) Inventors: Sumio Iijima, Aichi (JP); Masako Yudasaka, Ibaraki (JP); Minfang Zhang, Ibaraki (JP)

(73) Assignees: Japan Science and Technology Agency, Saitama (JP); NEC Corporation, Tokyo (JP)

( * ) Notice: Subject to any disclaimer, the term of this patent is extended or adjusted under 35 U.S.C. 154(b) by 643 days.

(21) Appl. No.: 10/521,575

(22) PCT Filed: Apr. 1, 2003

(86) PCT No.: PCT/JP03/04182

§ 371 (c)(1),
(2), (4) Date: Jul. 20, 2005

(87) PCT Pub. No.: WO2004/060801

PCT Pub. Date: Jul. 22, 2004

(65) Prior Publication Data

US 2006/0013758 A1    Jan. 19, 2006

(30) Foreign Application Priority Data

Jan. 6, 2003   (JP) .............................. 2003-000718

(51) Int. Cl.
  *C01B 31/02*   (2006.01)
(52) U.S. Cl. ...................... 423/461; 977/750
(58) Field of Classification Search ........................ None
See application file for complete search history.

(56) References Cited

U.S. PATENT DOCUMENTS

| | | | | |
|---|---|---|---|---|
| 5,116,582 A | * | 5/1992 | Cooper et al. | 422/186.3 |
| 5,174,877 A | * | 12/1992 | Cooper et al. | 204/193 |
| 5,294,315 A | * | 3/1994 | Cooper et al. | 204/158.2 |

FOREIGN PATENT DOCUMENTS

| | | |
|---|---|---|
| EP | 1 129 990 A1 | 9/2001 |
| JP | 2002-80211 A | 3/2002 |
| JP | 2002-255519 A | 9/2002 |
| JP | 2003-146631 A | 5/2003 |
| WO | 98/39250 A1 | 9/1998 |

OTHER PUBLICATIONS

Yudasaka, et al. (2003) Chemical Physics Letters, 374(1-2): 132-36.*
Kataura, et al. (1999) Synthetic Metals, 103: 255-88.*
Wintmere, et al. (1995) Carbon, 33(7): 893-902.*
Huang, et al. (Feb. 2002) Chemosphere, 46(6): 815-25.*
Ajayan, et al. (Apr. 26, 2002) Science, 296(5568): 705.*
M. Yudasaka et al., "Diameter-selective removal of single-wall carbon nanotubes through light-assisted oxidation", *Chemical Physics Letters*, vol. 374, pp. 132-136 (Jun. 4, 2003).
P.D. Kichambare et al., "Laser irradiation of carbon nanotubes", *Materials Chemistry and Physics*, vol. 72, pp. 218-222 (2001).
N. Braidy et al., "Oxidation of Fe Nanoparticles Embedded in Single-Walled Carbon Nanotubes by Exposure to a Bright Flash of White Light", *Nano Letters*, vol. 2, No. 11, pp. 1277-1280 (2002).
Shinichi Nagasawa et al. "Effect of oxidation on single-wall carbon nanotubes", Chemical Physics Letters, vol. 328, pp. 374-380 (2000).
Vincent H. Crespi et al. "Site-selective radiation damage of collapsed carbon nanotubes", Applied Physics Letters, vol. 73, No. 17, pp. 2435-2437 (1998).

* cited by examiner

*Primary Examiner*—Robert M Kelly
(74) *Attorney, Agent, or Firm*—Wenderoth, Lind & Ponack, L.L.P.

(57) ABSTRACT

A method for selectively obtaining carbon nanotubes having specific structures by selectively obtaining carbon nanotubes having structures different from the structures of the carbon nanotubes to be vanished by irradiating carbon nanotubes with a light beam of single wavelength so as to have carbon nanotubes in specific electron states in the excited states, and oxidizing and combusting the carbon nanotubes in the excited states by an oxygen or an oxidizing agent so as to vanish the same.

12 Claims, 3 Drawing Sheets

METHOD OF SELECTING STRUCTURE OF CARBON NANOTUBE THROUGH PHOTOIRRADIATION

TECHNICAL FIELD

The present invention relates to a method for selecting structures for carbon nanotubes by the light irradiation. More specifically, the present invention relates to a method for selecting structures for carbon nanotubes by the light irradiation, capable of selectively obtaining only carbon nanotubes having specific structures by the light irradiation and the combustion at a low temperature.

BACKGROUND ART

Since the discovery of the carbon nanotube, its application to electronic semiconductors, electronic devices, or other fields has been strongly expected, and various studies have been carried out by a large number of researchers.

Among the carbon nanotubes, for example, a single-wall carbon nanotube has a shape with a piece of a graphite sheet comprising a six membered ring of carbons rolled like a cylinder. Depending on the rolling style of the graphite sheet, that is, the diameter of the carbon nanotube and the chirality (helical degree), the conductivity of the carbon nanotube differs completely so as to provide a metal or a semiconductor.

However, according to the production method for carbon nanotubes so far, the diameters or the chiralities of the carbon nanotubes to be produced cannot be controlled so that only inhomogeneous ones can be obtained, and thus the difference of the conductivity of the carbon nanotubes provided by the diameters or the chiralities has not been utilized sufficiently.

In contrast, recently, it was revealed that the chemical reaction can be promoted by the light irradiation. These days, it was also found out that the Flahren's reaction is carried out by the assistance of the light excitation. In view of these facts, it is considered that the light irradiation has a possibility to have any influence on the chemical reaction of the single-wall carbon nanotubes (SWNTs), however, the influence to the chemical reaction of the single-wall carbon nanotubes by the light irradiation has been completely unknown so far.

Then, in view of the above-mentioned circumstances, the present invention has been achieved, and its object is to provide a method for selectively obtaining carbon nanotubes, capable of solving the problems of the conventional technique, having structures different from the structures of the carbon nanotubes to be lysed by selectively combusting and lysing carbon nanotubes of specific structures.

DISCLOSURE OF INVENTION

In order to achieve the above-mentioned object, the present invention firstly provides a method for selecting structures for carbon nanotubes by the light irradiation, characterized in selectively obtaining carbon nanotubes having structures different from the structures of the carbon nanotubes to be lysed by irradiating carbon nanotubes with a light beam of single wavelength so as to have carbon nanotubes in a specific electron states in the excited states, and oxidizing and combusting the carbon nanotubes in the excited states by an oxygen or an oxidizing agent so as to lyse the same.

The present invention secondly provides the method for selecting structures for carbon nanotubes by the light irradiation according to the first invention, characterized in that the carbon nanotubes in the excited states are lysed by oxidizing and combusting at a temperature of 0° C. or more and 500° C. or less.

It thirdly provides the method for selecting structures for carbon nanotubes by the light irradiation according to the first or second invention, characterized in that the oxidizing agent is a hydrogen peroxide water, a nitric acid or a potassium permanganate.

It fourthly provides the method for selecting structures for carbon nanotubes by the light irradiation according to any one of the first to third inventions, characterized in that light beams having different wavelengths are irradiated to the carbon nanotubes respectively for selectively oxidizing and combusting carbon nanotubes having specific structures corresponding to the wavelength of each light beam so as to lyse the same.

Furthermore, it fifthly provides the method for selecting structures for carbon nanotubes by the light irradiation according to any one of the first to third inventions, characterized in that only carbon nanotubes having specific structures are selectively obtained by irradiating the carbon nanotubes successively with a plurality of light beams having different wavelengths.

Moreover, it sixthly provides the method for selecting structures for carbon nanotubes by the light irradiation according to any one of the first to fifth inventions, characterized in that the carbon nanotubes are single-wall carbon nanotubes.

BEST MODE FOR CARRYING OUT THE INVENTION

Figure 1:
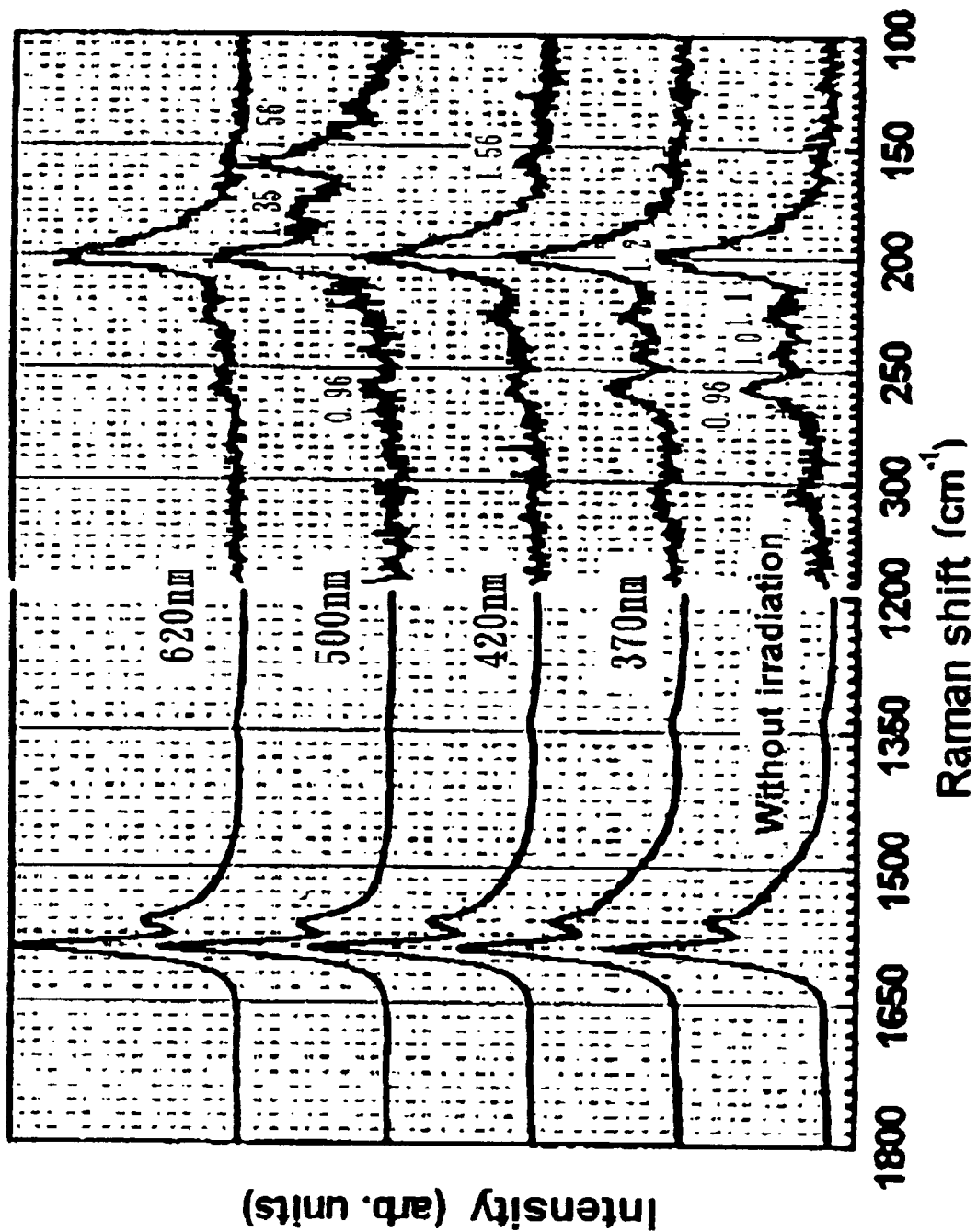
FIG. 1 is a graph showing an example of Raman spectra of an embodiment of the present invention.

The present invention has the above-mentioned characteristics, and the embodiments thereof will be explained hereafter.

A method for selecting structures for carbon nanotubes by the light irradiation according to the present invention is largely characterized in selectively obtaining only carbon nanotubes having structures different from the structures of the carbon nanotubes to be lysed by irradiating carbon nanotubes with a light beam of single wavelength so as to have carbon nanotubes in specific electron states in the excited states by absorbing the light beam, and oxidizing and combusting the carbon nanotubes in the excited states by an oxygen or an oxidizing agent so as to lyse the same. At the time, the carbon nanotubes in the excited states can be lysed by preferably oxidizing and combusting at a temperature of 0° C. or more and 500° C. or less.

That is, by irradiating the carbon nanotubes with a light beam of a single wavelength, only carbon nanotubes having specific structures can be lysed by combustion at a low temperature of 0° C. or more and 500° C. or less, and as a result, carbon nanotubes having structures different from the carbon nanotubes to be lysed can be obtained selectively.

As the light beam to be irradiated to the carbon nanotubes, any light beam can be used as long as it is a single wavelength light beam, and it may be a laser light beam or a non laser light beam. Moreover, in the case the carbon nanotubes are to be oxidized by an oxygen, it may be carried out in the atmosphere with the presence of an oxygen to the degree capable of oxidizing the carbon nanotubes. For example, it may be in the atmosphere including not only the oxygen, such as in the air. In the atmosphere including the oxygen, carbon nanotubes of specific structures can be combusted in a temperature range of 100° C. to 500° C.

Moreover, on the other hand, as an oxidizing agent for oxidizing the carbon nanotubes, an optional oxidizing agent can be used. In particular, a hydrogen peroxide water, a nitric acid or a potassium permanganate can be used preferably. For example, in the case a hydrogen peroxide water (concentration 10 to 30%) is used, carbon nanotubes of specific structures can be combusted and lysed in a range of 0° C. to 100° C.

As mentioned above, according to the method for selecting structures for carbon nanotubes by the light irradiation of the present invention, since carbon nanotubes having specific structures can be excited for promoting the oxidization thereof by irradiating the carbon nanotubes with a single wavelength light beam, and thereby the carbon nanotubes excited by heating at a low temperature can be combusted and lysed, carbon nanotubes of a good quality, having specific structures can be obtained without damaging the carbon nanotubes remaining without lysing.

Moreover, according to the method for selecting structures for carbon nanotubes by the light irradiation of the present invention, since light beams of different wavelengths are irradiated to the carbon nanotubes for selectively oxidizing and combusting carbon nanotubes having specific structures corresponding to the wavelength of each light beam so as to lyse the same, carbon nanotubes of necessary structures can optionally be obtained selectively.

Furthermore, since a plurality of light beams having different wavelengths are irradiated to the carbon nanotubes successively, only carbon nanotubes having specific structures further limited compared with the case of irradiating with a light beam of a light beam of one wavelength can be obtained selectively.

By using the above-mentioned method, carbon nanotubes having the necessary electric characteristics such as a metal and a semiconductor can selectively be obtained easily.

The method for selecting structures for carbon nanotubes by the light irradiation according to the present invention can be carried out particularly for single-wall carbon nanotubes so that single-wall carbon nanotubes having specific structures with the necessary electric characteristics can easily be obtained certainly.

Hereinafter, with reference to the accompanied drawings, the embodiments of the present invention will be explained in further details. Of course the invention is not limited to the examples herebelow, and it is needless to say that various embodiments can be used for the details.

EXAMPLES

Example 1

Single-wall carbon nanotubes produced by the HiPco method as a method for synthesizing carbon nanotubes by heating a carbon monoxide at a high pressure (CO+CO→C+$CO_2$) were treated with HCl for eliminating Fe. Then, light beams having 370 nm, 420 nm, 500 nm and 620 nm wavelengths were used for the light irradiation each at 320° C. for 2 hours in the air.

The Raman spectra thereof are shown in FIG. 1. As it is known by the comparison with the case without the light irradiation, although a light beam having a 370 nm wavelength does not influence the oxidization of the single-wall carbon nanotubes at all, the light beams of the other wavelengths promoted the oxidization of the single-wall carbon nanotubes having specific structures. In the case a light beam of a 420 nm wavelength is irradiated to the single-wall carbon nanotubes, as it is shown by the Raman spectrum, the single-wall carbon nanotubes of a 0.96 nm diameter and a 1.0 nm diameter were completely lysed, and those of 1.1 nm and 1.2 nm diameters remained without lysing. In the case of the irradiation with a light beam of a 500 nm wavelength, although the single-wall carbon nanotubes of about 1.0 nm and about 1.1 nm diameters were lysed, on the other hand in this case, two novel single-wall carbon nanotubes of about 1.35 nm and about 1.56 nm diameters appeared.

Furthermore, as a result of executing the light irradiation using a light beam of a 620 nm wavelength, only single-wall carbon nanotubes of about a 1.2 nm diameter remained, and the carbon nanotubes of the other diameters were vanished lysed. It was shown that the substantially the same results were provided for the oxygen concentration and the kind of the chemical bond of C and O regardless of the light irradiation of the different wavelengths or without the light irradiation in the all specimens formed by the HiPco method from the X ray photo electron spectroscopy (XPS). Thereby, it was learned that the lysed single-wall carbon nanotubes were combusted selectively instead of the chemical reaction with the oxygen or the formation of a carbonyl or a carboxyl compound.

Figure 2:
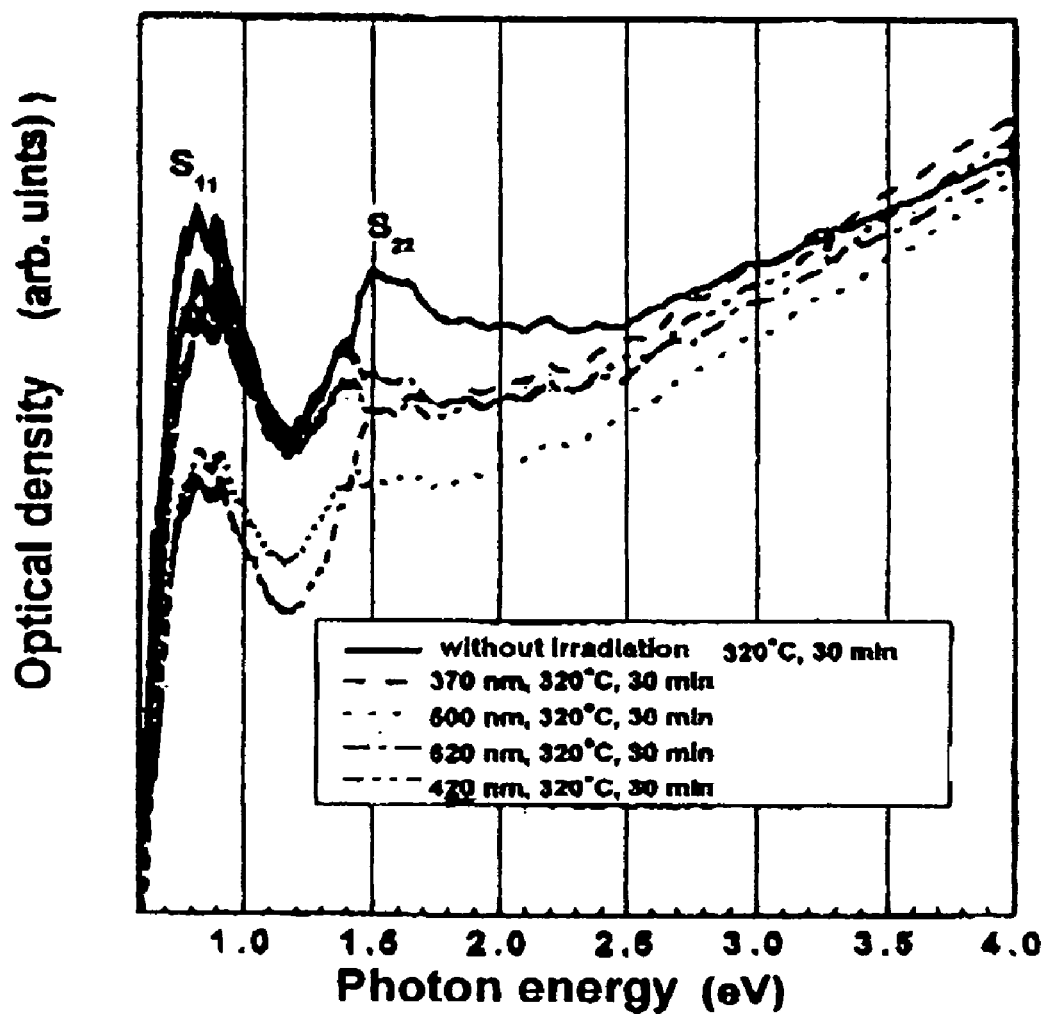
FIG. 2 is a graph showing an example of absorption spectra of an embodiment of the present invention.

Next, FIG. 2 shows absorption spectra of the case without the light irradiation and the cases of the light irradiation using light beams of 370 nm, 420 nm, 500 nm, and 620 nm wavelengths each at 320° C. for 30 minutes. Although the absorption spectra shows that the light irradiation does not influence the band $S_{11}$ peak (corresponding to the first intermediate transition), the $S_{22}$ (corresponding to the second intermediate transition) peak intensity of 1.37 eV corresponds to single-wall carbon nanotubes of a 1.2 nm diameter, with the intensity increased after the light irradiation of 420 nm, 500 nm or 620 nm, and the $S_{22}$ peak intensity of 1.5 eV and 1.63 eV (corresponding to the single-wall carbon nanotubes of 1.1 nm and 1.0 nm diameters) were reduced.

These results show that the light irradiation promoted the oxidization of the single-wall carbon nanotubes, and that a light beam of a specific wavelength selectively oxidized, combusted and lysed single-wall carbon nanotubes of specific structures.

Example 2

Figure 3:
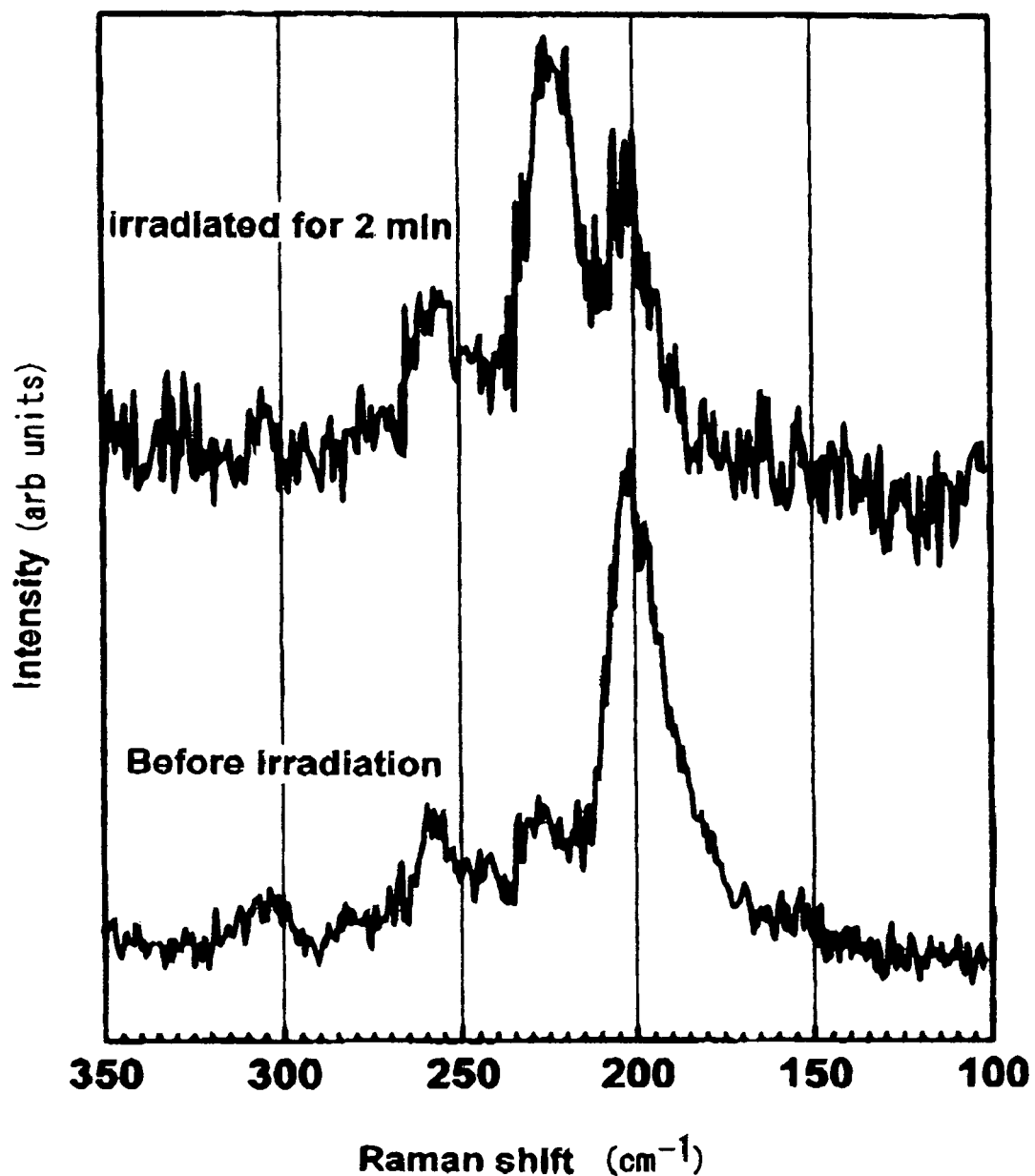
FIG. 3 is a graph showing an example of Raman spectra of another embodiment of the present invention.

Next, FIG. 3 shows the Raman spectra at the time of placing single-wall carbon nanotubes produced by the same method as in the example 1 in a hydrogen peroxide water, and executing the light irradiation for 2 minutes using a light beam having a 488 nm wavelength in the hydrogen peroxide water of 100° C. For the comparison, FIG. 3 also shows the Raman spectrum in the case without the light irradiation in states with the single-wall carbon nanotubes placed in a hydrogen peroxide water of 100° C.

As it is apparent from FIG. 3, in the case of the light irradiation of a 488 nm wavelength, the peak at 200 $cm^{-1}$ is reduced, and in contrast, in the case without the light irradiation, the Raman spectrum change was not observed before and after the process with the hydrogen peroxide water.

Therefore, the experiment results show that the light irradiation promotes the oxidization of the single-wall carbon nanotubes also in the case of using an oxidizing agent such as a hydrogen peroxide water, and it denotes that a light beam of a specific wavelength selectively oxidizes, combusts and lyses single-wall carbon nanotubes of specific structures.

INDUSTRIAL APPLICABILITY

As heretofore explained in detail, according to the present invention, a method for selecting structures for carbon nanotubes by the light irradiation, capable of selectively obtaining only carbon nanotubes having specific structures by the light irradiation and the combustion at a low temperature can be provided.

The invention claimed is:

1. A method for selecting single-walled carbon nanotubes of 1.2 nm diameter from a mixture of single-walled carbon nanotubes of various diameters, comprising irradiating the mixture of single-walled carbon nanotubes of various diameters with a light beam of a single wavelength of 620 nm under an oxidative environment to obtain single-walled carbon nanotubes of 1.2 nm diameter.

2. The method according to claim 1, wherein the oxidative environment comprises an oxidizing agent selected from the group consisting of hydrogen peroxide in water, nitric acid and potassium permanganate.

3. The method according to claim 2, wherein the oxidization is carried out at a temperature range of 0° C. to 500° C.

4. A method for removing single-walled carbon nanotubes of 0.96 nm and 1.0 nm diameters from a mixture of single-walled carbon nanotubes of various diameters, comprising irradiating the mixture of single-walled carbon nanotubes of various diameters with a light beam of a single wavelength of 420 nm under an oxidative environment to remove single-walled carbon nanotubes of 0.96 nm and 1.0 nm diameters.

5. The method according to claim 4, wherein the oxidative environment comprises an oxidizing agent selected from the group consisting of hydrogen peroxide in water, nitric acid and potassium permanganate.

6. The method according to claim 5, wherein the oxidization is carried out at a temperature range of 0° C. to 500° C.

7. A method for removing single-walled carbon nanotubes of 1.0 nm and 1.1 nm diameters from a mixture of single-walled carbon nanotubes of various diameters, comprising irradiating the mixture of single-walled carbon nanotubes of various diameters with a light beam of a single wavelength of 500 nm under an oxidative environment to remove single-walled carbon nanotubes of 1.0 nm and 1.1 nm diameters.

8. The method according to claim 7, wherein the oxidative environment comprises an oxidizing agent selected from the group consisting of hydrogen peroxide in water, nitric acid and potassium permanganate.

9. The method according to claim 8, wherein the oxidization is carried out at a temperature range of 0° C. to 500° C.

10. A method for removing single-walled carbon nanotubes of 0.96 nm, 1.0 nm and 1.1 nm diameters from a mixture of single-walled carbon nanotubes of various diameters, comprising irradiating the mixture of single-walled carbon nanotubes of various diameters with a light beam of a single wavelength of 620 nm under an oxidative environment to remove single-walled carbon nanotubes of 0.96 nm, 1.0 nm and 1.1 nm diameters.

11. The method according to claim 10, wherein the oxidative environment comprises an oxidizing agent selected from the group consisting of hydrogen peroxide in water, nitric acid and potassium permanganate.

12. The method according to claim 11, wherein the oxidization is carried out at a temperature range of 0° C. to 500° C.

* * * * *